United States Patent [19]
Yoshida et al.

[11] Patent Number: 5,572,356
[45] Date of Patent: Nov. 5, 1996

[54] OPTICAL AMPLIFIER

[75] Inventors: Ichiro Yoshida; Masayuki Shigematsu; Michio Murata, all of Kanagawa, Japan

[73] Assignee: Sumitomo Electric Industries, Ltd., Osaka, Japan

[21] Appl. No.: 502,618

[22] Filed: Jul. 14, 1995

[30] Foreign Application Priority Data

Jul. 15, 1994 [JP] Japan .................................. 6-186269

[51] Int. Cl.$^6$ ...................................................... H01S 3/00
[52] U.S. Cl. ................................................. 359/341; 372/6
[58] Field of Search ................................. 359/341; 372/6

[56] References Cited

U.S. PATENT DOCUMENTS 5,155,779  10/1992  Avramopoulos et al. ................. 385/24
5,245,690   9/1993  Aida et al. .............................. 385/142
5,268,786  12/1993  Matsushita et al. .................... 359/341
5,299,048   3/1994  Suyama ................................... 359/179

Primary Examiner—Mark Hellner
Attorney, Agent, or Firm—Cushman Darby & Cushman, L.L.P.

[57] ABSTRACT

The present invention provide an optical amplifier that excites a rare earth element dopant in a light transmitting medium with exciting light generated from a semiconductor laser such that the light propagating through the light transmitting medium is amplified, wherein drive power being supplied to drive the semiconductor laser is modulated with an AC component having a higher frequency than the frequency corresponding to the lifetime of the excited state of the ion of the rare earth element, and the drive current from the drive power has an amplitude which is higher than the threshold value of the semiconductor laser.

12 Claims, 2 Drawing Sheets

5,572,356

OPTICAL AMPLIFIER

BACKGROUND OF THE INVENTION

1. Field of the Invention

The present invention relates to an optical amplifier using a rare earth element doped optical fiber that is to be excited with a semiconductor laser.

2. Description of the Related Art

Recently, an optical amplifier that amplifies light at 1.5 µm using silica fibers doped with Er (erbium) and other rare earth elements are being commercialized.

FIG. 4 is a schematic view showing the optical amplifiers. As shown in the drawing, the optical amplifier basically includes a rare earth element doped optical fiber 1 serving as actual light amplifying element, a light source 2 emitting exciting light injected into the optical fiber 1, and an optical fiber 3 guiding light to be amplified with the optical fiber 1. The exciting light source 2 has not only a semiconductor laser device 21 which is a light source in the true sense of the term but also a drive circuit 22 including a DC power source for supplying drive power to the laser device, an automatic output control circuit, etc., as well as an optical fiber 20 for coupling the output light from the semiconductor laser device 21 to the rare earth element doped optical fiber 1. The optical fiber 1 has a filter 4 inserted at the output and for rejecting the exciting light component from the output light.

The optical amplifier composed in the way described just above can employ a semiconductor laser operating at a wavelength of 1.48 µm or 0.98 µm as a source of exciting light. On the other hand, studies are being made of optical amplifiers that amplify light at 1.3 µm replacing the Er doped optical fiber by a Pr (praseodymium) doped fluoride optical fiber.

Semiconductor lasers used as a source of exciting light in the optical amplifier of the type described above share the common problem that their operation is instabilized by light traveling in the return path. Referring to FIG. 4, if light returning from the rare earth element doped optical fiber 1 towards the light source is reinjected into the semiconductor laser 21, so-called "return light noise" will increase to make the operation of the optical amplifier instable.

In order to solve this problem, it has been proposed with an optical amplifier using a semiconductor laser operating at a wavelength of 1.48 µm that the return light is blocked with an optical isolator inserted between the optical fiber and the semiconductor laser. This proposal is actually implemented.

FIG. 5 is a schematic view showing the general layout of an optical amplifier employing an optical isolator. In FIG. 5, the components which are the same as those shown in FIG. 4 are identified by same numerals.

In FIG. 5, in addition to the optical amplifier shown in FIG. 4, an optical isolator 5 is inserted between the semiconductor laser 21 and the optical fiber 20. Once the light emitting from the semiconductor laser 21 passes through the optical isolator 5, no light will return to the semiconductor laser 21 because of the blocking action of the isolator 5.

As described above, it is known that the operation of an optical amplifier can be stabilized by using an optical isolator to block the light traveling in the return path to the semiconductor laser. However, the optical isolator that has been developed to date for the purpose of blocking the return light is only adaptive to operations at a wavelength of 1.48 µm, and the layout shown in FIG. 5 cannot be realized for an optical amplifier that uses a semiconductor laser operating at a wavelength of 0.98 µm.

SUMMARY OF THE INVENTION

It is an object of the present invention to provide an optical amplifier that can be stably operated irrespective of the wavelength of exciting light.

The optical amplifier of the present invention is comprised of a semiconductor laser for generating an exciting light; a light transmitting medium in which a rare earth element is doped, the rare earth element being excited by the exciting light to amplify the light propagating through the light transmitting medium; and modulator for modulating a drive power supplied to the semiconductor laser with an AC component having a higher frequency than the frequency corresponding to the life time of the excited state of the ion of the rare earth element; wherein a drive current of the drive power has an amplitude which is higher than the threshold value of the semiconductor laser.

The optical amplifier constructed according to the present invention is capable of reducing the adverse effect that will be caused on a semiconductor laser by the light traveling in the return path. Additionally, the amplifier is capable of suppressing any discontinuous change that may occur in response to the change in the operating point of the semiconductor laser. Hence, the overall operational stability of the optical amplifier can be markedly increased.

BRIEF DESCRIPTION OF THE DRAWINGS

In the accompanying drawings.

DETAILED DESCRIPTION OF THE INVENTION

Figure 1:
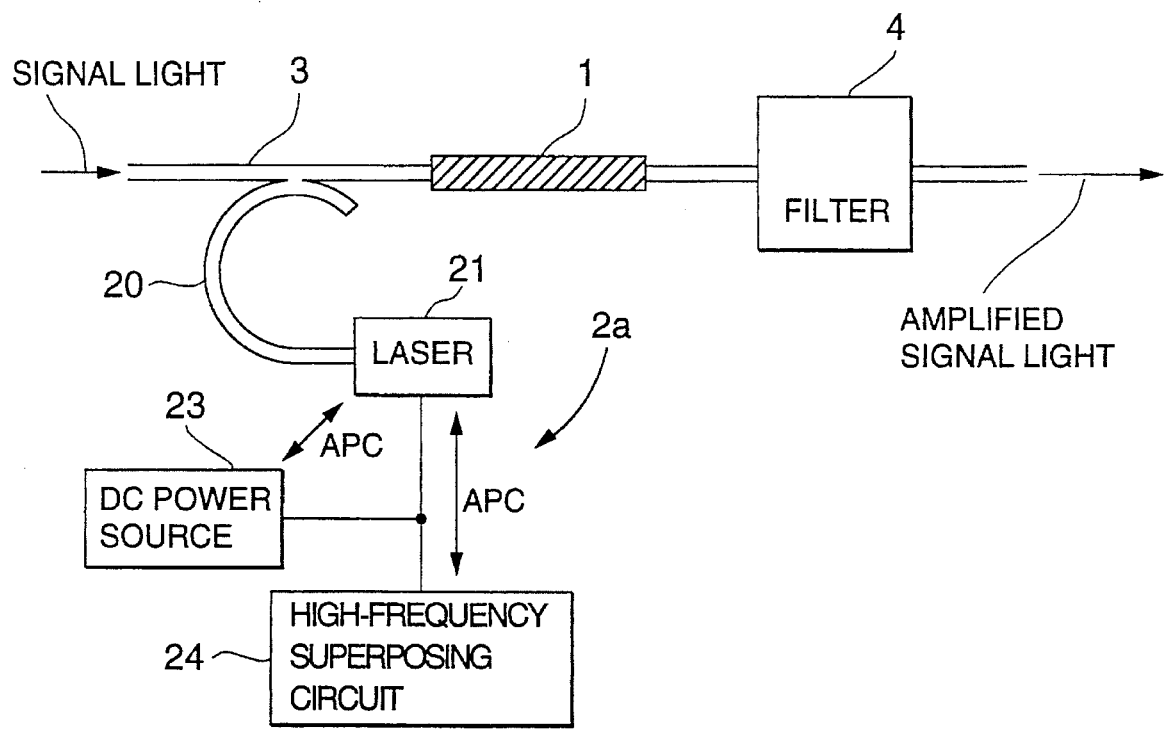
FIG. 1 is a schematic view showing a specific configuration of an optical amplifier of the invention.

The detailed description of the present invention will be described as follows.

The present invention is an improvement of an optical amplifier that excites a rare earth element dopant in light transmitting medium with exciting light generated from a semiconductor laser such that the light propagating through the light transmitting medium is amplified. In the optical amplifier of the present invention, a drive power being supplied to drive the semiconductor laser is modulated with an AC component having a higher frequency than that corresponding to the lifetime of the excited state of the ion of the rare earth element, and the drive current has an amplitude which is higher than the threshold value of the semiconductor laser. In addition, the amplitude may be always higher than the threshold value.

The optical amplifier of the invention is based on a technology such that an AC component superposed on the drive current to a semiconductor laser produces light having a multi-mode emission spectrum. In certain technical fields such as optical disks, high-frequency components (ca. 500 MHz to 4 GHz) much higher than signal frequencies are superposed on the drive current to semiconductor lasers.

If the drive current supplied to a semiconductor laser increases, the temperature of the active layer rises and the emitting wavelength shifts toward the longer side. In some lasers, this wavelength shift is not gradual and, particularly in the case of a semiconductor laser operating in a single longitudinal mode, a significant shift with a magnitude about 3 nm sometimes occurs when the drive current exceeds a certain critical value. Hence, the emitting wavelength is unstable at points near the critical value and the slight change of the operating current by disturbances or other factors causes the large shift of the emitting wavelength. If the hopping of such instantaneous variations exceeds 2 nm, there is a great potential for the occurrence of large noise in the optical amplifier.

According to the present invention, the semiconductor laser is driven with a drive current which is obtained by superposing an AC component so that the emitting wavelength changes more than 2 nm with the drive current within a permissible range thereof.

However, it should be noted that if the drive current to the semiconductor laser as generated by the drive power which has an AC component superposed in the manner described above becomes lower the threshold level of the semiconductor laser on certain occasions, the semiconductor laser turns off intermittently, and the average output of the exciting light decreases accordingly. Therefore, the amplitude of the high-frequency component to be superposed on the drive power to the semiconductor laser should be so set that the resulting drive current will always be greater than the threshold level of the semiconductor laser.

Additionally, the signals can potentially be affected by the modulation of the exciting light with the superposed high-frequency component, because the frequencies of the signals handled by optical amplifiers are generally much higher. In practice, excited Er ions have a life-time on a few microseconds. The variations in the characteristics of the optical amplifier due to the variations in an excitation intensity may sometimes be neglected, because the variations in the excitation intensity has a much shorter period than the life time of the excited Er ion. However, the influence of such variations in the drive current really exists to appear as actual noise, and the influence must be eliminated. Hence, according to preferred embodiments of the invention, the optical amplifier adopts the following unique design to solve the problem just mentioned above.

That is, noise due to the high-frequency component superposed on a drive current occurs in frequency bands which are harmonics of the frequency of the high-frequency component. On the other hand, according to the present invention, the distribution of the power spectrum of the AC component superposed on the drive current does not become higher in a particular range than in any other ranges. Accordingly, the noise is averaged in any ranges, and an influence in the particular range is hard to appear. The spectrum distribution of the high-frequency component to be superposed on a drive current may be set in such a manner that the power spectrum of the optical signal to be handled with the optical amplifier will not overlap the frequency of that component and frequencies which are harmonics thereof. This approach is effective not only in preventing the stability of the semiconductor laser from being deteriorated by the light traveling in the return path but also in suppressing the noise that would otherwise occur due to the high-frequency component superposed on the drive current.

The frequency of the AC component to be superposed on the drive current may be reduced to about 10 MHz. However, the frequency of the AC component to be superposed is preferably not less than 500 MHz, because the adverse effect of the noise is increased with decreasing the frequency.

It should also be noted that the semiconductor laser to be employed in the optical amplifier of the invention is preferably of a design that produces a decreasing amount of leakage current at high frequency, as disclosed in Published Unexamined Japanese Patent Application (Kokai) No. Hei. 4-30278. The use of such semiconductor laser suppresses high-frequency backage current. The frequency of the AC component to be superposed on the drive current ranges suitably from about 500 MHz to 4 GHz.

Further, the semiconductor laser may be driven with voltage rather than current so that the drive current merely consists of the AC component. If the breakdown voltage in a reverse direction is sufficiently high, the current flows only in a forward direction, and the spectrum of the laser is emitted in a multi-mode.

Embodiments of the present invention will be described as follows for the purpose of further illustrating the invention. However, embodiments are in no way to be taken as limiting the technical scope of the invention.

EMBODIMENT 1

Figure 4:
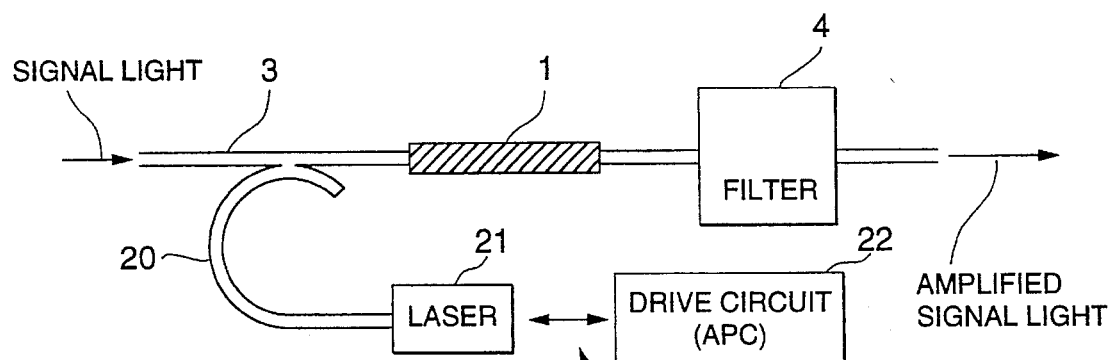
FIG. 4 is a diagram showing the basic configuration of an optical amplifier that is operated by excitation with a semiconductor laser.
Figure 5:
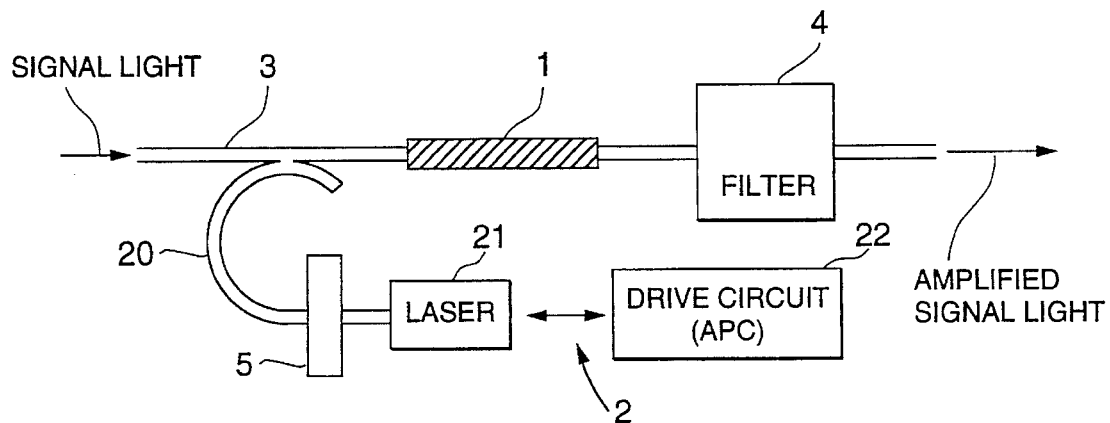
FIG. 5 is a diagram showing the configuration of a conventional optical amplifier equipped with an optical isolator.

FIG. 1 is a schematic view showing a specific configuration of the optical amplifier of the invention. As shown in FIG. 1, the basic layout of the optical amplifier of the present invention which includes a rare earth element doped optical fiber 1, an exciting light source 2a and a lightguide 3 is the same as that of the conventional one shown in FIG. 4. The difference between the present invention and the conventional one is that the exciting source 2a including a semiconductor laser 21 has a unique design in the optical amplifier of the invention.

The exciting light source 2a includes not only the semiconductor laser 21 and a DC power source 23 but also a high-frequency component superposing circuit 24. The high-frequency component superposing circuit 24 may be include various emitting circuits that are appropriately combined with either themselves or filter circuits. The exciting light source 2a thus constructed can drive the semiconductor laser 21 with the drive current having a high-frequency component superposed as supplied from the circuit 24.

Figure 2:
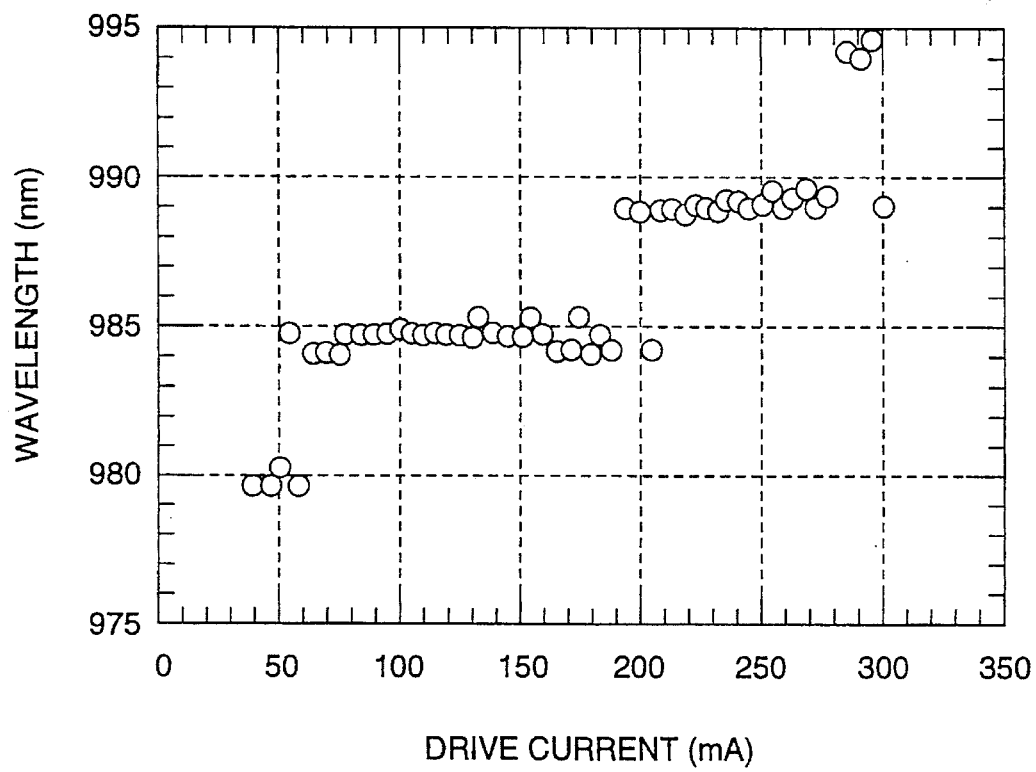
FIG. 2 is a graph showing the wavelength-drive current characteristic of a semiconductor laser module.

Employing the design just described above, one can fabricate an optical amplifier that operates upon excitation with a semiconductor laser having an emitting wavelength of 0.98 μm. FIG. 2 is a graph showing the wavelength-drive current characteristic of a semiconductor laser module that can be used in this embodiment. When the module was supplied with a drive current of 200 mA, an optical output of 37 mW coupled to the optical fiber. The threshold level of the module was about 30 mA. The module having these characteristics can be driven with a drive current that includes a bias current of 185 mA and a superposed AC component having an amplitude of ±55 mA and a frequency of 600 MHz. The average output from the laser being driven in this manner is controlled by changing the relative lengths of the durations of small and large current values, as shown in FIG. 3.

The optical amplifier employing this module may be driven with a drive current that solely consists of an ordinary DC component. However, in this case, if the operating point of the drive current passes a point where an abrupt change in wavelength occurs, the operation of the optical amplifier may become unstable or large noise can potentially occur.

On the other hand, the optical amplifier of the invention is driven with a drive current that changes cyclically between a value higher and a value lower than the boundary value where the abrupt change in wavelength occurs. Hence, even if the current value fluctuates more or less, only the proportions for the occurrence of two frequencies changes but there is no substantial change in the quality of the output laser light. The optical amplifier of the invention can not only reduce the adverse effect of the light traveling in the return path but also improve a system resistance against disturbances that vary the operating point of the semiconductor laser.

It should be noted here that the current value that causes discrete changes in the emitting wavelength as shown in FIG. 2 can simply be investigated by changing the current value being actually applied to the semiconductor laser.

Figure 3A:
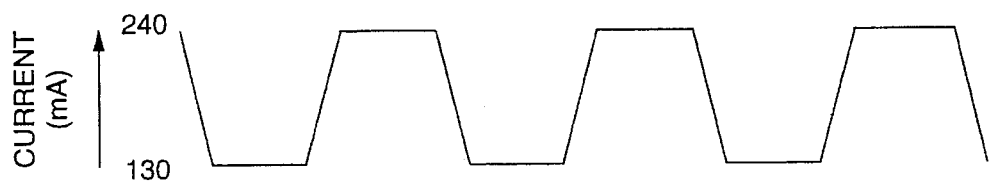
FIGS. 3A and 3B are timing charts for illustrating drive currents being applied to drive the semiconductor laser in the optical amplifier of the invention.
Figure 3B:
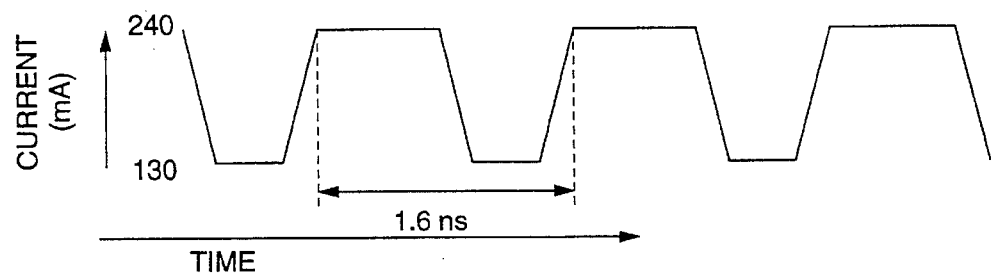

In order to stabilize the average output of the semiconductor laser, only the DC component of the output from the drive power source may be changed. If the drive current contains an AC component having an asymmetric waveform, it is preferred to control the laser output by changing the length of duration of a large drive current relative to the length of duration of a small drive current as shown in FIGS. 3A and 3B. This control method does not effect the peak values of the drive power and, an end face of the semiconductor laser is less likely to experience COD breakdown.

The operational stability of the optical amplifier composed in the manner described above can be evaluated by measuring the noise level while it is operated continuously in such an environment that the room temperature varies due, for example, to poor air conditioning. In other words, the invention can advantageously be applied to the case where the optical amplifier is operated continuously when the ambient temperature varies constantly.

EMBODIMENT 2

An experiment was conducted under the same conditions as in Embodiment 1 except that the frequency of the AC component to be superposed on the drive current was reduced to 3 MHz. Also in this case, the optical amplifier employing this module may be driven with a drive current that solely consists of an ordinary DC component. However, in this case, if the operating point of the drive current passes a point where an abrupt change in wavelength occurs, the operation of the optical amplifier may become unstable or large noise can potentially occur.

The optical amplifier of the invention is driven with a drive current that changes cyclically between a value higher and a value smaller than the boundary value where the abrupt change in wavelength occurs. Hence, even if the current value fluctuates more or less, only the proportions for the occurrence of the frequencies changes but there is no substantial change in the quality of the output laser light. The optical amplifier of the invention can not only reduce the adverse effect of the light traveling in the return path but also improve a system resistance against disturbances that vary the operating point of the semiconductor laser.

EMBODIMENT 3

When the semiconductor laser module used in Embodiment 1 was supplied with a drive current of 240 mA, an output of about 46 mW was delivered at the output end of the optical fiber. When a drive current of 130 mA was supplied, an output of about 21 mW was produced. The module produced an average optical output of about 33 mW when the semiconductor laser was operated with a drive current consisting of generally equal lengths of durations of a large and a small current as shown in FIG. 3A. The average output increased to about 36 mW when the semiconductor laser was driven with a drive current in which the ratio of the length of duration of a large current to that of a small current was about 6:4 as shown in FIG. 3B.

In this embodiment, the semiconductor laser is allowed to emit at a comparatively longer wavelength of 984 to 990 nm. However, if an Er-doped optical fiber is to be employed, the emitting wavelength is preferably selected at 980 nm where the Er ion has a large absorption coefficient.

The present invention has primarily been accomplished for application to an optical amplifier that is to be excited with a semiconductor laser emitting at 0.98 μm or 1.24 μm. The optical fiber has not been commercialized in the absence of a suitable optical isolator. The invention can of course be applied to optical amplifiers employing the conventional optical isolator. An optical amplifier to be excited by light at 1.48 μm that employs an optical isolator may also utilize the present invention for the purpose of further stabilizing its operation.

The optical amplifier of the invention can be fabricated not only with a rare-earth element doped optical fiber but also with a rare-earth element doped planar waveguide. Other applications of the invention include excitation of an Er-doped fiber laser with a 0.98 μm laser, and excitation of a YAG laser with a semiconductor.

What is claimed is:

1. An optical amplifier comprising:

a semiconductor laser for generating an exciting light;

a light transmitting medium in which a rare earth element is doped, said rare earth element being excited by said exciting light; and modulating means for modulating a drive current of a power source connected to said semiconductor laser with an AC component having a higher frequency than the frequency corresponding to the life time of excited states of an ion of said rare earth element;

wherein said drive current of said drive power has an amplitude which is higher than a threshold value of said semiconductor laser.

2. An optical amplifier according to claim 1, wherein the drive current varies a wavelength of an emitting peak of said semiconductor laser in the range of 2 nm or more.

3. An optical amplifier according to claim 1, wherein the drive current varies to include a current value at which a wavelength of an emitting peak of said semiconductor laser changes discretely.

4. An optical amplifier according to claim 1, wherein said drive current has a large current flow and a small current flow that are changed with maximum and minimum values of said drive current being held constant.

5. An optical amplifier according to claim 2, wherein said drive current has a large current flow and a small current flow that are changed with maximum and minimum values of said drive current being held constant.

6. An optical amplifier according to claim 3, wherein said drive current has a large current flow and a small current flow that are changed with maximum and minimum values of said drive current being held constant.

7. An optical amplifier according to claim 1, wherein the frequency of said AC component is selected in such a way that at least one of a frequency band of said AC component and harmonics of said frequency band do not overlap with the high power band of the signal to be handled with said optical amplifier.

8. An optical amplifier according to claim 2, wherein the frequency of said AC component is selected in such a way that at least one of a frequency band of said AC component and harmonics of said frequency band do not overlap with the high power band of the signal to be handled with said optical amplifier.

9. An optical amplifier according to claim 3, wherein the frequency of said AC component is selected in such a way that at least one of a frequency band of said AC component and harmonics of said frequency band do not overlap with the high power band of the signal to be handled with said optical amplifier.

10. An optical amplifier according to claim 4, wherein the frequency of said AC component is selected in such a way that at least one of a frequency band of said AC component and harmonics of said frequency band do not overlap with the high power band of the signal to be handled with said optical amplifier.

11. An optical amplifier according to claim 1, wherein the frequency of the AC component to be superposed on the drive current is in a range of 500 MHz to 4 GHz.

12. An optical amplifier according to claim 1, wherein said amplitude is always higher than the threshold value of said conductor laser.

* * * * *